Patented Aug. 16, 1932

1,872,035

UNITED STATES PATENT OFFICE

ERNEST F. GRETHER AND LINDLEY E. MILLS, OF MIDLAND, MICHIGAN, ASSIGNORS TO THE DOW CHEMICAL COMPANY, OF MIDLAND, MICHIGAN, A CORPORATION OF MICHIGAN

AZO DYE FROM SUBSTITUTED ANILIDES OF 2.3 HYDROXYNAPHTHOIC ACID

No Drawing.    Application filed June 8, 1931.   Serial No. 543,010.

This invention relates to new azo dyestuffs of the type wherein an arylide of 2.3-hydroxynaphthoic acid is coupled with a diazotized arylamine, but distinguished from azo dyes hitherto known in that the aforesaid arylide component thereof is formed by condensing said acid with an aromatic amine having probably the general formula;

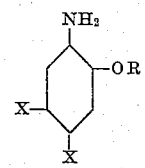

wherein X represents a halogen, and wherein R represents an alkyl, aryl, di-aryl, or aralkyl radical. The azo dyes hereinafter fully described and claimed have probably the general formula;

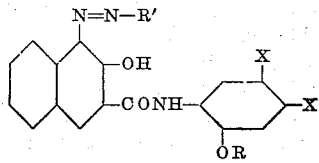

wherein X represents a halogen group, R represents an alkyl, aryl, di-aryl, or aralkoxy radical, and R' represents an aryl radical of the benzene or naphthalene series.

In our pending application, Serial No. 537,504, filed May 14, 1931, and entitled "Substituted anilides of 2.3-hydroxynaphthoic acid", we have described the preparation and properties of the several arylides from which the azo dyes hereinafter described are prepared. It is well known that azo dyes fast to light and washing are produced by coupling arylides of 2.3-hydroxynaphthoic acid with diazotized or tetrazotized arylamines. We have discovered, however, that when mono-alkoxy-di-halo-anilides or mono-aryloxy-di-halo-anilides of 2.3-hydroxynaphthoic acid are so coupled the dyestuffs formed thereby are fast toward light and washing and the colors produced are deep and clear in tone. The invention, then, consists of azo dyestuffs derived from mono-alkoxy-di-halo-anilides and mono-aryloxy-di-halo-analides of 2.3-hydroxynaphthoic acid, together with methods for the preparation thereof, as hereinafter fully described and particularly pointed out in the claims.

The herein described dyestuffs dye cotton and other fibers directly in a wide range of colors varying from red to black and in clear and brilliant tones. They are best prepared by developing on the fiber, but may also be produced in substance per se or deposited upon suitable substrata to form lakes, in which forms they are useful pigments because of their insolubility, stability, and fastness.

Substituted anilines from which the arylides hereinafter utilized were made, were themselves prepared in the following way:—

Para-dichlorobenzene was chlorinated to obtain trichlorobenzene and the latter nitrated to the corresponding trichloro-mono-nitro-benzene of melting point 57° C., and having probably the formula;

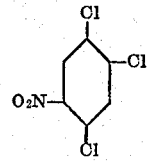

Mono - methoxy - dichloro - nitrobenzene, having a melting point of approximately 74° C. and having probably the formula;

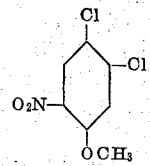

was prepared by reacting a well stirred mixture consisting of 22.7 grams (0.1 mole) of the aforementioned trichloro-nitro-benzene, 6.5 grams (0.1 mole) of sodium hydroxide and 150 cc. of methyl alcohol at a temperature of 20°–25° C. for a period of 16 hours. The reaction mixture was then poured into 400 cc. of water, the resulting mixture filtered, and the residue recrystallized from methyl alcohol. The product has a melting point of approximately 74° C. Upon analysis, our product was found to contain practically the theoretical quantity of chlorine. The yield of crude product was practically theoretical.

Mono-ethoxy-dichloro-nitrobenzene having probably the formula;

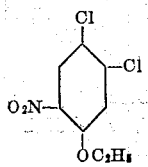

was prepared in the following way:—

A solution consisting of 27 grams (0.1 mole) of tri-chloro-nitrobenzene and 4 grams (0.1 mole) of sodium hydroxide dissolved in 150 cc. of absolute ethyl alcohol was permitted to stand for a period of from 10 to 12 hours and at a temperature of from 25°–30° C. The reaction mixture was then poured into 400 cc. of water and the resulting mixture filtered, washed and dried. There was obtained, thereby, 23.5 grams of material melting at 50°–54° C. Recrystallization from methyl alcohol raised the melting point to 61° C. The product was analyzed and found to contain the theoretical quantity of chlorine.

Mono - phenoxy - dichloro - nitrobenzene having probably the formula;

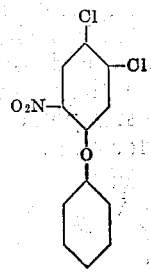

was prepared in the following way:—

A solution consisting of 8.4 grams (0.2 mole) of 95 per cent pure sodium hydroxide, 10 cc. of water and 100 cc. of phenol was heated until all water was removed and the temperature of the issuing vapor was that of the boiling point of pure phenol. The flask was then cooled and 200 cc. of toluene added in order to prevent over-heating during subsequent treatment of the reaction mixture. After the addition of toluene, 45.3 grams (0.2 mole) of trichloro-nitrobenzene was added and the mixture refluxed gently for a period of 2 hours. The reaction mixture was then cooled, poured into water and the toluene layer washed with excess dilute sodium hydroxide to remove phenol and sodium chloride. The toluene was removed by heating to 100° C. in vacuo and on a water bath. There was obtained 47.4 grams of product having a melting point of approximately 74°–75° C.

Mono-orthophenylphenoxy-dichloro-nitrobenzene was prepared in a manner similar to that described above, except that ortho-phenylphenol was used in place of phenol. The product obtained consisted of light yellow crystals having a melting point of approximately 120.5° C. The yield was practically 89 per cent theoretical.

The mono-alkoxy-dichloro-anilines and mono-aryloxy-dichloro-anilines used in preparing the arylides from which the azo dyes hereinafter described were made, were themselves prepared by reducing the above described nitro compounds in the following way:—

In a 3-liter, 3-neck flask fitted with an oil seal stirrer and reflux condenser were placed 400 grams of iron filings, 200 cc. of water, 50 cc. of ethyl alcohol and 2 cc. of glacial acetic acid. The mixture was stirred and refluxed for one-half hour, 0.25 of a gram molecular weight of the nitro compound being added in small quantities during this period. Stirring and refluxing were continued for from 4 to 16 hours, then 2 to 3 grams of sodium carbonate and 300 cc. of benzene added to the mixture. After stirring for an additional one-half hour, the benzene layer was separated, the aqueous layer filtered and the filtrate again extracted with a 300 cc. portion of benzene. The combined benzene extracts were then treated with an excess of concentrated hydrochloric acid. The hydrochloride of the amine precipitated either immediately or upon standing and was filtered from the mixture and washed with benzene. The yield was usually about 85 per cent theoretical. From the previously mentioned nitro compounds the following amines were prepared in the manner described; mono-methoxy-dichloro-aniline having a melting point of approximately 58° C., mono-ethoxy-dichloro-aniline, which was found to be liquid at room temperature, mono - phenoxy - dichloro - aniline having a melting point of approximately 84° C. and mono-orthophenylphenoxy-dichloro-aniline having a melting point of approximately 101° C.

A preferred manner in which azo dyestuffs comprising the invention may be prepared is illustrated in the specific examples given below, it being understood, however, that such examples are not to be construed as a limitation upon the invention:—

Example 1

The mono-methoxy-dichloro-anilide of 2.3-hydroxynaphthoic acid is prepared by heating equimolecular quantities of mono-methoxy-dichloro-aniline and 2.3-hydroxynaphthoic acid in the presence of approximately 13 per cent of their combined weight (slightly more than one-third of a molecular equivalent) of phosphorus trichloride under reflux and with stirring and in the presence of sufficient toluene to permit such stirring, for a period of from 3 to 5 hours. An excess of sodium carbonate over that required to neutralize the acid present is then added and the toluene removed by distilling with steam. The aqueous residue containing the anilide product in suspension therein is filtered and the precipitate is then purified by dissolving in dilute, 1 to 2 per cent, caustic alkali solution, preferably in the presence of alcohol, filtering from unreacted monomethoxy-dichloro-aniline, and precipitating by acidification of the alkaline solution. The intermediate compound so produced has probably the formula;

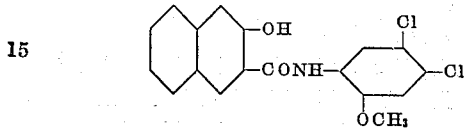

Cotton material is impregnated with a slightly alkaline solution of the above arylide to which may be added advantageously, but not necessarily, formaldehyde and a fixative, such as Turkey red oil or an aluminum salt. The material is then dipped in a cold solution of sodium acetate or carbonate, and the dye developed by adding a diazo solution derived from 3-amino-4-methoxy-diphenyl. The color developed is a clear, dark cardinal. The dyestuff has probably the formula;

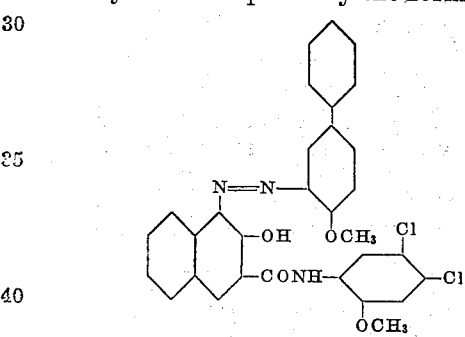

*Example 2*

By procedure similar to that described in Example 1, the mono-ethoxy-dichloro-anilide of 2.3-hydroxynaphthoic acid was prepared by condensing mono-ethoxy-dichloro-aniline with 2.3-hydroxynaphthoic acid. The dye was developed by adding a diazo solution from 3.4-dichloro-aniline. The color developed was a Castilian red. The dyestuff has probably the formula;

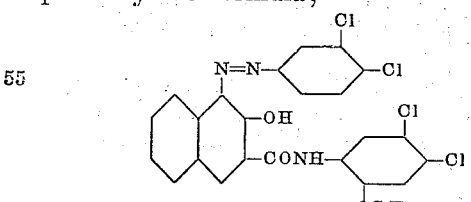

*Example 3*

The mono-phenoxy-dichloro-anilide of 2.3-hydroxynaphthoic acid was prepared by condensing mono-phenoxy-dichloro-aniline with 2.3-hydroxynaphthoic acid in a way similar to that described in Example 1. The dye was developed by treatment with a diazo solution from 2-phenyl-4-nitro-aniline. The color developed was scarlet. The dyestuff has probably the formula;

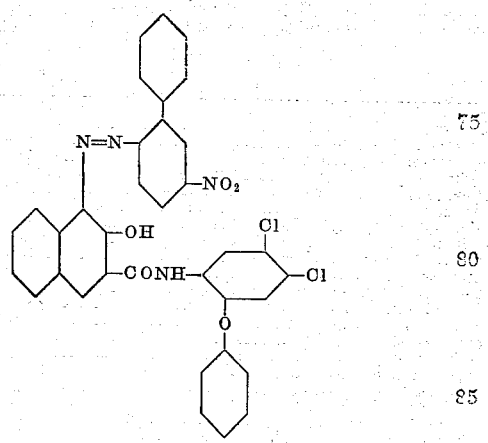

*Example 4*

The mono-orthophenylphenoxy-dichloro-anilide of 2.3-hydroxynaphthoic acid, having probably the formula;

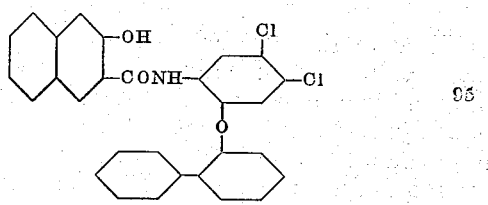

was prepared by condensing mono-orthophenylphenoxy-dichloro-aniline with 2.3-hydroxynaphthoic acid in a manner similar to that described in Example 1. The dye was developed by treatment with a diazo solution from 3-phenyl-4-methoxy-aniline. The color developed was strawberry. The dyestuff has probably the formula;

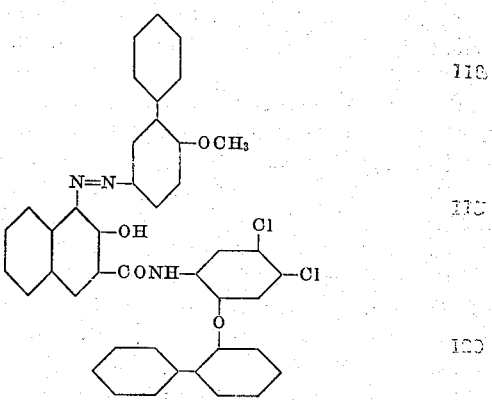

In like manner, we have prepared other dyes of the same general type, for example, those shown in the accompanying table, the color of the dyes being designated therein according to the "Standard Color Card of America", (1928 Ed.), issued by the Textile Color Card Association of the United States, Inc.

Table

| Amines diazotized and coupled with substituted anilides of 2.3-hydroxynaphthoic acid | Colors of azo dyes formed by coupling diazotized amines with | | | |
|---|---|---|---|---|
| | Mono-methoxy-dichloro-anilide of 2.3-hydroxy-naphthoic acid | Mono-ethoxy-dichloro-anilide of 2.3-hydroxy-naphthoic acid | Mono-phenoxy-dichloro-anilide of 2.3-hydroxy-naphthoic acid | Mono-ortho-phenylphenoxy-dichloro-anilide of 2.3-hydroxy-naphthoic acid |
| M-nitro-aniline | Paprica | Paprica | Tangerine | Indian orange |
| 2-chloro-4-nitro-aniline | Goya | Goya | Paprica | Tangerine |
| O-amino-diphenyl ether | Castilian red | Scarlet | Castilian red | Weigelia |
| 3.4-dichloro-aniline | Pimento | | Paprica | Geranium |
| Alpha-phenoxy naphthylamine | Plum | Prune | Purple | Maroon |
| Dianisidine | Homage blue | Homage blue | Ensign blue | Purple navy |
| 4.4'-diamino-diphenyl oxide | Cardinal | Cardinal | Cardinal | Castilian red |
| Alpha-naphthylamine | Garnet | | | Raspberry |
| 3-phenyl-4-methoxy-aniline | Maroon | | | |
| 2-nitro-4-methyl-aniline | Goya | | Castilian red | |
| 2.2'-dimethoxy-3.3'-diamino-1.1'-dinaphthyl | Burgundy | | | |
| 2-methyl-5-nitro-aniline | Castilian red | | Castilian red | |
| 5.8-dichloro-1-amino-naphthalene | Raspberry | | | |
| 3-chloro-4-methoxy-aniline | Goya | | Harvard crimson | |
| 1.5-diamino-naphthalene | Egg plant | | Castilian red | |
| 3-benzoylamino-aniline | Castilian red | | | |
| 4-benzoylamino-aniline | Dark cardinal | | | |
| 4.4'-dibromo-2.2'-diamino-diphenyl oxide | Dark cardinal | | | |
| 3-chloro-4-phenoxy-aniline | Goya | | | |
| 4-amino-naphthyl-azo-4'-aniline | Navy blue | | | |
| Amino-dinaphthyl oxide | | | Tangerine | |
| 2.4.5-trichloro-aniline | Scarlet | | | |
| 4-(phenyl azo)-1-amino-naphthalene | Egg plant | | Midnight blue | Taupe |
| 4-amino-azobenzene | Dark cardinal | | Raspberry | |
| O-nitro-aniline | Scarlet | | | |
| 4-(3'-nitro-phenyl,1'-azo)-1-amino-naphthalene | Midnight blue | | | |

While in the detailed Example 1 cotton fiber has been specifically referred to as the material to be dyed with the herein described new dyestuffs, other natural or synthetic fibers may likewise be dyed therewith, such as silk, rayon or the like. It is immaterial as regards the novelty of our invention whether the dye is applied by developing on the fiber or prepared in substance for use as a pigment. Mordanting or other auxiliary treatments for promoting the absorption of the dye by the fiber, or after treatment with metallic salts, e. g. chromium, copper, or aluminum salts, for fixing the dye or modifying its color tone may be optionally employed without departing from the spirit of our invention.

In the following claims it is understood that the invention comprehends the coupling of the herein described arylides of 2.3-hydroxynaphthoic acid with any diazotized aromatic mono-, di-, or poly-amino compound, as well as the azo dyestuffs derived therefrom.

Other modes of applying the principle of our invention may be employed instead of the one explained, change being made as regards the method or materials employed, provided the steps or compounds stated by any of the following claims or the equivalent of such stated steps or compounds be employed.

We therefore particularly point out and distinctly claim as our invention:—

1. In a method of making an azo dyestuff, the step which consists in coupling an arylide of 2.3-hydroxynaphthoic acid having the general formula;

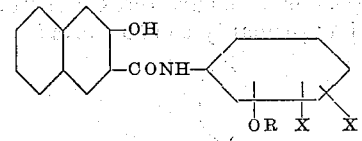

wherein X represents a halogen group, and wherein R represents a radical selected from the group consisting of alkyl radicals and aryl radicals of the benzene and diphenyl series, with a diazotized aromatic amino compound.

2. In a method of making an azo dyestuff, the step which consists in coupling an arylide of 2.3-hydroxynaphthoic acid having probably the formula;

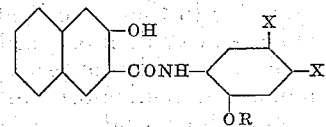

wherein X represents a halogen group, and wherein R represents a radical selected from the group consisting of alkyl radicals and aryl radicals of the benzene and diphenyl series, with a diazotized aromatic amino compound.

3. In a method of making an azo dyestuff, the step which consists in coupling an arylide of 2.3-hydroxynaphthoic acid having probably the formula;

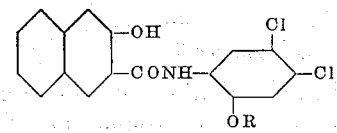

wherein R represents a radical selected from the group consisting of alkyl radicals and aryl radicals of the benzene and diphenyl series, with a diazotized aromatic amino compound.

4. In a method of making an azo dyestuff, the step which consists in coupling an arylide of 2.3-hydroxynaphthoic acid having probably the formula;

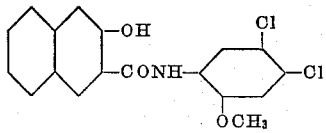

with a diazotized aromatic amino compound.

5. In a method of making an azo dyestuff, the step which consists in coupling an arylide of 2.3-hydroxynaphthoic acid having probably the formula;

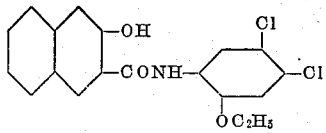

with a diazotized aromatic amino compound.

6. In a method of making an azo dyestuff, the step which consists in coupling an arylide of 2.3-hydroxynaphthoic acid having probably the formula;

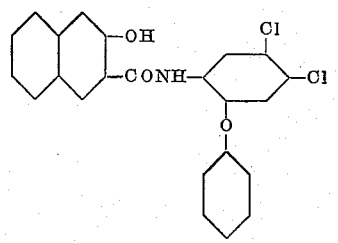

with a diazotized aromatic amino compound.

7. As a new compound, an azo dyestuff having the general formula;

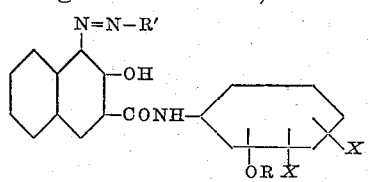

wherein X represents a halogen group, R represents a radical selected from the group consisting of alkyl radicals and aryl radicals of the benzene and diphenyl series, and R' represents an aryl radical of the benzene or naphthalene series.

8. As a new compound, an azo dyestuff having probably the general formula;

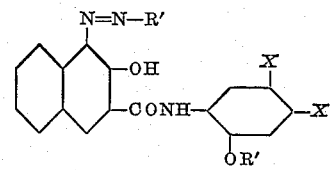

wherein X represents a halogen group, R represents a radical selected from the group consisting of alkyl radicals and aryl radicals of the benzene and diphenyl series, and R' represents an aryl radical of the benzene or naphthalene series.

9. As a new compound, an azo dyestuff having probably the formula;

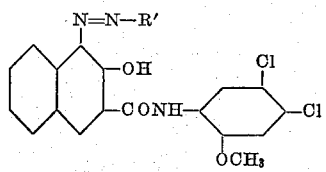

wherein R' represents an aryl radical of the benzene or naphthalene series.

10. As a new compound, an azo dyestuff having probably the formula;

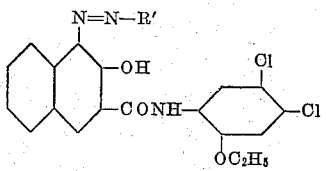

wherein R' represents an aryl radical of the benzene or naphthalene series.

11. As a new compound, an azo dyestuff having probably the formula;

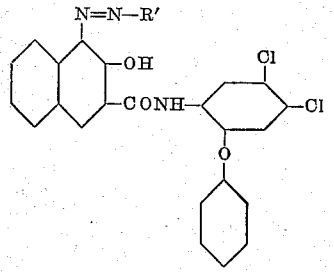

wherein R' represents an aryl radical of the benzene or naphthalene series.

Signed by us this 29th day of May, 1931.

ERNEST F. GRETHER.
LINDLEY E. MILLS.

Certificate of Correction

Patent No. 1,872,035. August 16, 1932.

ERNEST F. GRETHER ET AL.

It is hereby certified that error appears in the printed specification of the above-numbered patent requiring correction as follows: Page 1, line 49, for the compound word " mono-aryloxy-di-halo-analides " read *mono-aryloxy-di-halo-anilides;* page 2, line 77, for " flash " read *flask;* page 5, lines 55 to 61, claim 8, strike out the formula and insert instead—

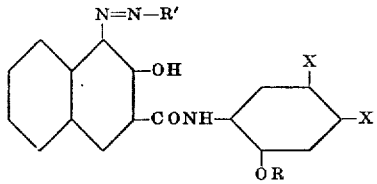

and that the said Letters Patent should be read with these corrections therein that the same may conform to the record of the case in the Patent Office.

Signed and sealed this 1st day of November, A. D. 1932.

[SEAL.]
M. J. MOORE,
*Acting Commissioner of Patents.*